United States Patent
Weidmann et al.

(10) Patent No.: US 12,522,538 B2
(45) Date of Patent: Jan. 13, 2026

(54) BRANCHED COPOLYMERS AS ADDITIVES FOR VISCOSITY REDUCTION OF MINERAL BINDER COMPOSITIONS

(71) Applicant: SIKA TECHNOLOGY AG, Baar (CH)

(72) Inventors: Jürg Weidmann, Winterthur (CH); Jörg Zimmermann, Winterthur (CH); Lukas Frunz, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 874 days.

(21) Appl. No.: 17/779,030

(22) PCT Filed: Nov. 25, 2020

(86) PCT No.: PCT/EP2020/083325
§ 371 (c)(1),
(2) Date: May 23, 2022

(87) PCT Pub. No.: WO2021/105187
PCT Pub. Date: Jun. 3, 2021

(65) Prior Publication Data
US 2023/0101651 A1  Mar. 30, 2023

(30) Foreign Application Priority Data
Nov. 29, 2019 (EP) ................................ 19212573

(51) Int. Cl.
*C04B 24/26* (2006.01)
*C04B 28/02* (2006.01)

(52) U.S. Cl.
CPC .......... *C04B 24/2647* (2013.01); *C04B 28/02* (2013.01)

(58) Field of Classification Search
CPC . C04B 24/2647; C04B 28/02; C04B 2103/34; C04B 2111/00103; C04B 40/0039; C04B 24/32; C04B 28/021; C04B 40/0608; C08G 65/24; C08G 65/2609; C08G 65/2618; C08G 65/2624; C08G 65/2633; C08L 71/02
See application file for complete search history.

(56) References Cited

U.S. PATENT DOCUMENTS

| | | | |
|---|---|---|---|
| 4,857,218 A | 8/1989 | Meschke et al. | |
| 2011/0015361 A1* | 1/2011 | Al-Hellani | C07C 49/255 526/318.5 |
| 2012/0214901 A1* | 8/2012 | Bury | C04B 28/02 524/4 |

FOREIGN PATENT DOCUMENTS

| | | | | |
|---|---|---|---|---|
| DE | 19947631 A1 | 6/2000 | | |
| EP | 0116978 A2 | 8/1984 | | |
| JP | 2014-510689 A | 5/2014 | | |
| WO | WO-2007062711 A2 * | 6/2007 | ......... | C04B 24/2647 |
| WO | 2010112775 A1 | 10/2010 | | |
| WO | 2011006838 A2 | 1/2011 | | |
| WO | 2012/113765 A1 | 8/2012 | | |
| WO | WO-2014135318 A1 * | 9/2014 | ........... | C04B 24/267 |
| WO | 2014170159 A1 | 10/2014 | | |

OTHER PUBLICATIONS

May 17, 2022 International Preliminary Report on Patentability issued in International Patent Application No. PCT/EP2020/083325.
Feb. 18, 2021 International Search Report issued in International Patent Application No. PCT/EP2020/083325.
Feb. 18, 2021 Written Opinion issued in International Patent Application No. PCT/EP2020/083325.

* cited by examiner

*Primary Examiner* — Doris L Lee
(74) *Attorney, Agent, or Firm* — Oliff PLC

(57) ABSTRACT

The use of branched copolymers of the general structure (I) as additives for increasing the flow rate and for reducing the viscosity of mineral binder compositions. Further, mineral binder compositions including at least one branched copolymer of the general structure (I):

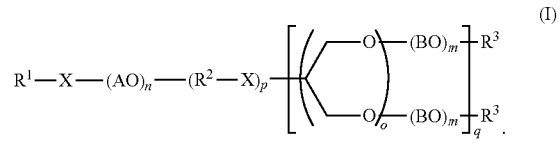

18 Claims, No Drawings

BRANCHED COPOLYMERS AS ADDITIVES FOR VISCOSITY REDUCTION OF MINERAL BINDER COMPOSITIONS

TECHNICAL FIELD

The invention relates to the use of branched copolymers as additives for increasing the flow rate and for reducing the viscosity of a mineral binder composition. A further aspect of the invention relates to a mineral binder composition and to a hardened shaped body comprising the branched copolymer.

BACKGROUND

Dispersants or flow agents are used in the building industry as plasticizers or water- reducing agents for binder compositions, for example concrete, mortar, cements, gypsums and lime. Dispersants used are generally organic polymers which are added to the mixing water or admixed with the binder compositions in solid form. In this way, it is advantageously possible to alter both the consistency of the binder composition during processing and to alter the properties in the hardened state.

The choice and dosage of a suitable dispersant depend especially on the specific composition, the processing methodology or the end use of the binder composition. Particularly in the case of specific binder compositions, for example specialty concrete or specialty mortars, this is a demanding task.

Specialty concretes especially include concretes that are produced with a low ratio of water/mineral binder (w/b ratio), i.e. contain little water based on the mineral binder. Such concretes are especially high-performance concretes (HPC), ultrahigh- performance concretes (UHPC) and/or self-compacting concretes (SCC).

A significant advantage of SCC is that it flows rapidly and without separation merely under gravity, automatically fills cavities and loses air without application of compaction energy. There is thus no need for vibration as in the case of conventional concrete. Self-compacting concrete is therefore particularly advantageous when high installation performance is required, in demanding geometric shapes, in the case of close-mesh reinforcement, at low component thicknesses, or in situations in which application of additional compaction energy is possible only with difficulty, if at all.

Further advantages of concretes having a low w/b ratio are especially their low porosity in the hardened state, which enables particularly high strength.

However, such concretes having a low w/b ratio, after being made up with water, also have an undesirably high viscosity and tack. Production, handling and introduction of such concretes is therefore frequently particularly time-consuming and energy-intensive.

In practice, high-performance plasticizers in the form of polycarboxylate ethers (PCEs) are typically used in order to improve the flow characteristics of mineral binder compositions. Conventional PCEs normally show a significant reduction in water level and reduce the yield point of mineral binder compositions, but they have only a minor effect, if any, on viscosity. Furthermore, PCEs typically have a retarding effect on hydration and hence evolution of strength of mineral binders.

EP 2 986 580 therefore describes the use of specific PCEs for increasing the flow rate and/or for reducing the viscosity of mineral binder compositions. The comb polymers feature a low molar mass of the side chain and a low molar ratio of side chains to acid groups in the polymer backbone. However, these PCEs likewise cause a reduction in the water demand of mineral binders and have a retarding effect thereon.

WO 2010/112775 describes branched polyethers with phosphonic acid end groups, wherein the branching is effected by incorporation of a nitrogen group into the polymer structure. The polyethers described cause a reduction in the viscosity of fresh concrete. A disadvantage, however, is that these polyethers, especially in the case of concretes with a low w/b ratio, typically have to be used in a high dosage and nevertheless have little effect on yield points or slump, and often have highly retarding and water-reducing properties.

EP 2 964 586, finally, describes copolymers as dispersants for mineral binders, wherein the copolymers contain units derived from (i) an ethylenically unsaturated acid and (ii) an ethylenically unsaturated branched polyether macromonomer. These dispersants have the disadvantage that they are produced using epichlorohydrin, which is difficult to handle. Moreover, these copolymers often lead to unwanted additional input of air and likewise to a reduction in the water demand of the mineral binder.

There is thus still a need for additives for mineral binder compositions, especially for concretes or mortars having a low w/b ratio, which assure optimal rheology and hence processing properties of these mineral binder compositions and which are easily obtainable. More particularly, there is a need for additives for increasing the flow rate and for reducing the viscosity of mineral binder compositions. At the same time, it would be advantageous if these additives had only a very low water reduction capacity, if any.

SUMMARY OF THE INVENTION

It is an object of the present invention to provide additives for mineral binder compositions, especially for concretes or mortars having a low w/b ratio, which enable a controlled increase in the flow rate and a reduction in the viscosity of mineral binder compositions. If possible, this should leave further properties of the mineral binder compositions unchanged, especially spread, slump or yield point. The additive should preferably additionally be usable together with other additives, especially with plasticizers such as PCEs.

It has been found that, surprisingly, this object is achieved by the use of copolymers as additives as claimed in claim 1.

The present invention therefore relates to the use of copolymers as additives for increasing the flow rate and/or for reducing viscosity in mineral binder compositions, wherein the copolymers can be prepared in a multistage process comprising the steps of 1) optionally reacting a starter S, selected from the group consisting of alcohols, amines, carboxylic acids or amides of the general formula $R^1$-XH, with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, C7-C30 aralkyl or C1-C18 carbonyl, X=O or NH, Hal=Cl, Br or I, and $R^2$=C1-C16 alkyl, 2) reacting a starter S, selected from the group consisting of alcohols, amines, carboxylic acids or amides of the general formula
$R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH, or the reaction product from step 1) with glycidol or epichlorohydrin or a mixture of glycidol and an alkoxylating agent or a mixture of epichlorohydrin and an alkoxylating agent, 3) optionally reacting the reaction product from step 2) with an alkoxylating agent.

A particular advantage of the use of copolymers of the invention as additives in mineral binder compositions lies in the increase in the flow rate or the reduction in the viscosity of the compositions with virtually unchanged spread, or slump, compared to mineral binder compositions without copolymer of the invention but otherwise of the same composition. More particularly, the increase in flow rate or the reduction in viscosity can be achieved with virtually unchanged spread and/or slump in mineral binder compositions having a low w/b ratio.

io Further advantages of the use of copolymers of the invention as dispersants in mineral binder compositions are less demixing or separation of the constituents of the mineral binder composition, less unwanted input of air, and no significant intrinsic water reduction capacity of the copolymers. Specifically the latter is significant since copolymers of the invention can thus be combined with known water reducers, for example superplasticizers such as lignosulfonates, polynaphthalenesulfonates, polymelaminesulfonates and/or polycarboxylate ethers, in existing formulations without having to adjust the dosage of the water reducer.

Finally, copolymers of the invention are notable for a simple synthesis that preferably does not require the use of epichlorohydrin. This is advantageous since epichlorohydrin is problematic on account of its toxicity and carcinogenicity.

Further aspects of the invention are the subject of other independent claims. Particularly preferred embodiments of the invention are the subject of the dependent claims.

WAYS OF EXECUTING THE INVENTION

A first aspect of the invention relates to the use of copolymers as additives for increasing the flow rate and for reducing the viscosity of mineral binder compositions, wherein the copolymers are prepared in a multistage process comprising the steps of 1) optionally reacting a starter S, selected from the group consisting of alcohols, amines, carboxylic acids or amides of the general formula $R^1$-XH, with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, C7-C30 aralkyl or C1-C18 carbonyl, X=O or NH, Hal=Cl, Br or I, and $R^2$=C1-C16 alkyl, 2) reacting a starter S, selected from the group consisting of alcohols, amines, carboxylic acids or amides of the general formula $R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH, or the reaction product from step 1) with glycidol or epichlorohydrin or a mixture of glycidol and an alkoxylating agent or a mixture of epichlorohydrin and an alkoxylating agent, 3) optionally reacting the reaction product from step 2) with an alkoxylating agent.

More particularly, the use of a copolymer of the invention increases the flow rate of the mineral binder composition and reduces its viscosity. It is additionally particularly advantageous that copolymers of the invention at least do not contribute significantly, if at all, to a reduction in the water demand of the mineral binder composition.

A measure used for the reduction in viscosity in the present context is a decrease in the flow time or funnel flow time according to DIN EN 12350-9 and/or a reduction in the run time according to JSCE-F 541-1999. The lower the flow time/funnel flow time and/or the run time, the lower the viscosity of a mineral binder composition. A further measure for the reduction in viscosity in the present context is an increase in the flow rate measured according to Swiss standard SIA 262.238 or as $t_{500}$ according to Japanese standard JIS A1150. An elevated flow rate accordingly means a lower viscosity of a mineral binder composition.

The term "water demand" in the present context is understood to mean the amount of water required to establish a particular spread, measured according to standard DIN EN 12350-5, in a given binder composition.

In the case of the inventive use of copolymers as additives to mineral binder compositions, a mineral binder composition made up with water that contains these copolymers accordingly shows an elevated flow rate and lower viscosity, but no additional increase in spread, compared in each case to the same mineral binder composition that has been made up with the same amount of water but does not contain any copolymer. This means that the composition, after addition of the copolymer of the invention, flows more quickly and has a lower viscosity than an analogous composition that does not contain the copolymer, or than an analogous composition that contains a noninventive copolymer, for example a polycarboxylate ether (PCE).

The copolymer, in the case of the inventive use and a dosage of 0.01-10% by weight, especially 0.1-7% by weight or 0.2-5% by weight, based in each case on the total weight of mineral binder, preferably influences the spread according to DIN EN 12350-5 and/or the slump according to DIN EN 12350-2 of the mineral binder composition by less than 15%, in particular less than 10%, preferably less than 5%, especially less than 3% or less than 2%. This means that the spread and/or the slump of the mineral binder composition after addition of 0.01-10% by weight, especially 0.1-7% by weight or 0.2-5% by weight, based in each case on the total weight of mineral binder, of a copolymer of the invention varies by less than 15%, in particular less than 10%, preferably less than 5%, especially less than 3% or less than 2%, from the spread and/or slump of an analogous composition that does not contain the copolymer of the invention.

Copolymers of the invention can be prepared in a multistage process comprising the steps of 1) optionally reacting a starter S, selected from the group consisting of alcohols, amines, carboxylic acids or amides of the general formula $R^1$-XH, with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, C7-C30 aralkyl or C1-C18 carbonyl, X=O or NH, Hal=Cl, Br or I, and $R^2$=C1-C16 alkyl, 2) reacting a starter S, selected from the group consisting of alcohols, amines, carboxylic acids or amides of the general formula $R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH, or the reaction product from step 1) with glycidol or epichlorohydrin or a mixture of glycidol and an alkoxylating agent or a mixture of epichlorohydrin and an alkoxylating agent, 3) optionally reacting the reaction product from step 2) with an alkoxylating agent.

Preference is given to conducting the individual steps of the process successively, without isolation or purification of the intermediates.

The reaction conditions in steps 1) to 3) may vary. For example, the reaction temperature, pressure and/or the type and amount of catalyst used in steps 1) to 3) may be different. In general, however, it is preferable when the reaction temperature, pressure and the type and amount of catalyst used in steps 1) to 3) are the same.

The reaction temperature may vary within the range between 80° C-180° C., especially 100° C-140° C. The pressure is preferably in the range of 1-5 bar, especially in the range of 1-3 bar.

The individual steps of the process are preferably conducted under catalysis. Suitable catalysts for the alkoxylations of steps 1) to 3) are known per se to the person skilled in the art. In preferred embodiments, reaction steps 1) to 3) are catalyzed. It is especially preferable to utilize the same catalyst for steps 1) to 3) without intermediate removal or deactivation thereof. Particularly suitable catalysts have been found to be alkali metal hydroxides and/or alkali metal alkoxides. In a preferred embodiment, the catalyst used is an alkali metal alkoxide of that alcohol which is also used as starter S. It may also be preferable to use sodium alkoxides, specifically sodium methoxide or sodium ethoxide, as catalyst.

A suitable process for preparing copolymers of the invention is specified, for example, in EP 0 116 978.

The starter S in the present context is a compound selected from the group consisting of alcohols, amines, carboxylic acids or amides of the general formula $R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH. It is particularly preferable that the starter S, apart from the XH group, does not contain any further nucleophilic groups. When the starter S is an alcohol, it is a monool, i.e. an alcohol having just one OH group. When the starter S is an amine, it is a primary amine, i.e. an amine having an $NH_2$ group. The starter S is not a secondary or tertiary amine. If the starter S is a carboxylic acid, it is a monocarboxylic acid.

In particularly preferred embodiments, the starter S is selected from the group consisting of methanol, ethanol, n-propanol, i-propanol, n-butanol, 2-butanol, prenol, isoprenol, n-hexanol, cyclohexanol, n-octanol, 2-ethylhexanol, lauryl alcohol, myristyl alcohol, geraniol, citronellol, cetyl alcohol, stearyl alcohol, vinyl alcohol, allyl alcohol, methallyl alcohol, palmitoleyl alcohol, ( )eyl alcohol, linoleyl alcohol, linolenyl alcohol, phenol, benzyl alcohol, 4-methylbenzyl alcohol, anisyl alcohol, vanillin, methylamine, ethylamine, butylamine, cyclohexylamine, oleylamine, aniline, formic acid, acetic acid, propionic acid, butyric acid, valeric acid, isovaleric acid, caproic acid, 2-ethylhexanoic acid, caprylic acid, lauric acid, myristic acid, palmitic acid, stearic acid, oleic acid, linoleic acid, acrylic acid, methacrylic acid, benzoic acid, acrylamide, methacrylamide.

Alkoxylating agents in the context of the present invention are compounds that can be converted by polymerization to polyethers. Alkoxylating agents thus bring about alkoxylation, i.e. the formation of alkylene oxide or polyalkylene oxide units. In particular, alkoxylating agents in the context of the present invention contain oxirane, oxetane or oxolane structures. Particularly preferred alkoxylating agents are alkylene oxides selected from ethylene oxide, propylene oxide, 1,2-butylene oxide, cyclohexene oxide and/or tetrahydrofuran. Specifically, the alkoxylating agent is ethylene oxide and/or propylene oxide. It may be preferable to use just one alkoxylating agent in one of steps 1) to 3). In a very preferred embodiment, just one alkoxylating agent, especially ethylene oxide, is used in steps 1) to 3). Alternatively, it is possible to use two or more alkoxylating agents in steps 1) to 3), either as a mixture or each individually in any one of steps 1) to 3).

It is especially preferable that the starter S is selected from ethoxylated methanol, ethoxylated ethanol, ethoxylated vinyl alcohol, ethoxylated allyl alcohol, ethoxylated methallyl alcohol, ethoxylated isoprenol, ethoxylated acrylic acid and ethoxylated methacrylic acid. Most preferably, the starter S is selected from ethoxylated methanol and ethoxylated methallyl alcohol.

In a preferred embodiment, copolymers of the invention are prepared without the use of epichlorohydrin. The process for preparation is thus epichlorohydrin-free. Copolymers of the invention can accordingly preferably be prepared in a process comprising the steps of:

1) optionally reacting a starter S, selected from the group consisting of alcohols, amines, carboxylic acids or amides of the general formula $R^1$-XH, with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, C7-C30 aralkyl or C1-C18 carbonyl, X=O or NH, Hal=Cl, Br or I, and $R^2$=C1-C16 alkyl, 2) reacting a starter S, selected from the group consisting of alcohols, amines, carboxylic acids or amides of the general formula
   $R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH, or the reaction product from step 1) with glycidol or a mixture of glycidol and an alkoxylating agent, 3) optionally reacting the reaction product from step 2) with an alkoxylating agent.

In a particularly preferred embodiment, copolymers of the invention are prepared without the use of epichlorohydrin and using an alcohol as starter S. The process for preparation is thus epichlorohydrin-free. Copolymers of the invention can accordingly more preferably be prepared in a process comprising the steps of:

1) optionally reacting an alcohol $R^1$—OH with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, or C7-C30 aralkyl, X=O or NH, Hal=Cl, Br or I, and $R^2$=C1-C16 alkyl, 2) reacting an alcohol $R^1$—OH, where $R^1$=C1-C18 alkyl, C2-C18 alkylene, C3-C10 cycloalkyl, C6-C30 aryl, or C7-C30 aralkyl, or the reaction product from step 1) with glycidol or a mixture of glycidol and an alkoxylating agent, 3) optionally reacting the reaction product from step 2) with an alkoxylating agent.

In a further particularly preferred embodiment, copolymers of the invention are prepared without the use of epichlorohydrin and using an amine as starter S. The process for preparation is thus epichlorohydrin-free. Copolymers of the invention may accordingly also more preferably be prepared in a process comprising the steps of:

1) optionally reacting an amine $R^1$-$NH_2$ with an alkoxylating agent and/or a halogenated alcohol or halogenated amine Hal-$R^2$-XH, where $R^1$=C1-C18 alkyl, C2-C18 alkylene, C3-C10 cycloalkyl, C6-C30 aryl, or C7-C30 aralkyl, X=O or NH, Hal=Cl, Br or I, and $R^2$=C1-C16 alkyl, 2) reacting an amine $R^1$-$NH_2$, where $R^1$=C1-C18 alkyl, C2-C18 alkylene, C3-C10 cycloalkyl, C6-C30 aryl, or C7-C30 aralkyl, or the reaction product from step 1) with glycidol or a mixture of glycidol and an alkoxylating agent, 3) optionally reacting the reaction product from step 2) with an alkoxylating agent.

In a further particularly preferred embodiment, copolymers of the invention are prepared without the use of epichlorohydrin and using a carboxylic acid as starter S. The process for preparation is thus epichlorohydrin-free. Copolymers of the invention may accordingly also more preferably be prepared in a process comprising the steps of:

1) optionally reacting a carboxylic acid $R^1$—OH with an alkoxylating agent and/or a halogenated alcohol or halogenated amine Hal-$R^2$-XH, where $R^1$=C1-C18 carbonyl, X=O or NH, Hal=Cl, Br or I, and $R^2$=C1-C16 alkyl, 2) reacting a carboxylic acid $R^1$—OH, where $R^1$=C1-C18 carbonyl, or the reaction product from step 1) with glycidol or a mixture of glycidol and an alkoxylating agent, 3) optionally reacting the reaction product from step 2) with an alkoxylating agent.

In a very particularly preferred embodiment, copolymers of the invention are prepared without the use of epichlorohydrin and with the use of an alcohol as starter S, where the starter alcohol is first reacted with an alkoxylating agent. The process for preparation is thus epichlorohydrin-free. Copolymers of the invention may accordingly even more preferably be prepared in a process comprising the steps of:

1) reacting an alcohol $R^1$—OH with an alkoxylating agent, where $R^1$=C1-C18 alkyl, C2-C18 alkylene, C3-C10 cycloalkyl, C6-C30 aryl, or C7-C30 aralkyl, 2) reacting the reaction product from step 1) with glycidol or a mixture of glycidol and an alkoxylating agent, 3) optionally reacting the reaction product from step 2) with an alkoxylating agent.

It is especially preferable here when the process for preparing copolymers of the invention contains a step 3) as described above.

Copolymers of the invention, obtainable in a process as described above, may accordingly be copolymers of the general structure (I):

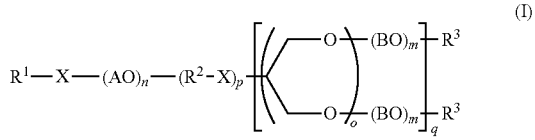

(I)

where $R^1$=C1-C18 alkyl, C2-C18 alkylene, C3-C10 cycloalkyl, C6-C30 aryl, C7-C30 aralkyl or C1-C18 carbonyl, preferably methyl, ethyl, vinyl, allyl, methallyl, isoprenyl, cyclohexyl, phenyl, acryloyl or methacryloyl, X=O or NH, A is in each case independently C1-C10 alkylene, preferably ethylene, propylene and/or butylene, $R^2$=C1-C16 alkyl, B is in each case independently C1-C10 alkylene, preferably ethylene, propylene and/or butylene, $R^3$=H, C1-C16 alkyl, or $C(O)R^1$ with $R^1$ as defined above, preferably H, m is in each case independently an integer in the range of 0-350, n is an integer in the range of 0-100, p is 0 or 1, q is an integer in the range of 1-10, and if q=1, o is an integer in the range of 1-50, and, if q>1, each o is independently an integer in the range of 1-50.

It is particularly preferable that p=0 when n>0.

The number of linear structural units $(BO)_m$ in the general structure (I) is dependent on o and q. The number of structural units $(BO)_m$ is equal to o×q+1. The number of linear structural units $(BO)_m$ corresponds to the level of branching. Since each of q and o is >0, the level of branching of copolymers of the invention is at least 2. In other words, copolymers of the invention are not linear copolymers. More particularly, copolymers of the invention are not purely linear polyethers.

Shown hereinafter for better elucidation are some example structures derived from the general formula (I) with defined combinations of o and q. These example structures shall in no way be considered to be limiting in respect of the copolymers of the invention.

If o=2 and q=1, this results in copolymers of the following general structure (Ia)

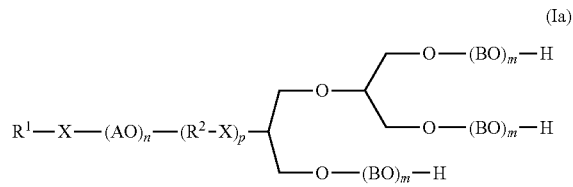

(Ia)

If o=3 and q=1, this results in copolymers of the following general structure (Ib)

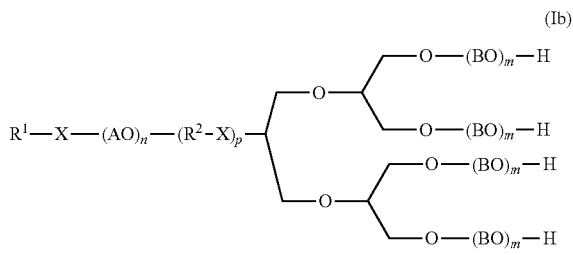

(Ib)

If o=1 and q=2, this results in copolymers of the following general structure (Ic)

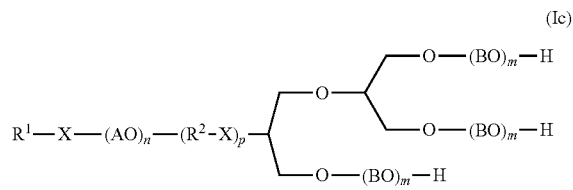

(Ic)

If o=2 and q=3, this results in copolymers of the following general structure (Id)

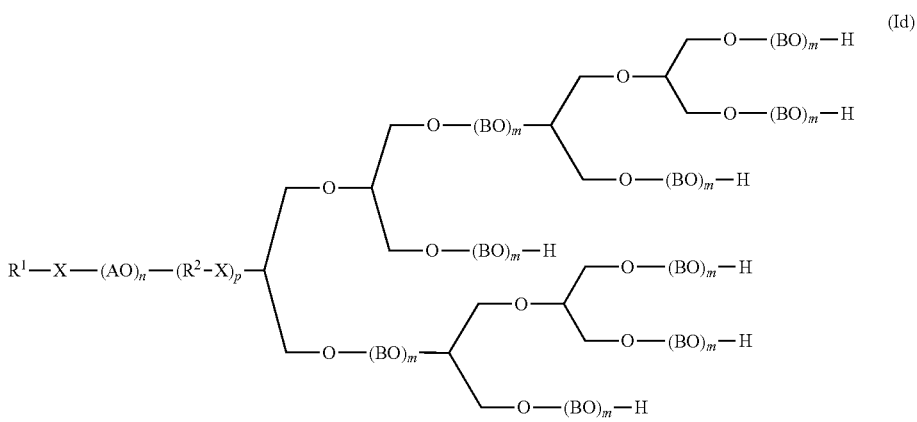

According to embodiments, the level of branching of copolymers of the invention is between 2 and 501, preferably between 2 and 200, more preferably between 2 and 100, particularly preferably between 3 and 50, especially between 5 and 20.

It will be clear to the person skilled in the art that the reaction in step 2) of the process of the invention for preparing copolymers can give rise to different regioisomers. These are regioisomers that form when the oxirane ring of glycidol is opened via the various carbon atoms according to the chemical reaction equation a) or b) as shown below.

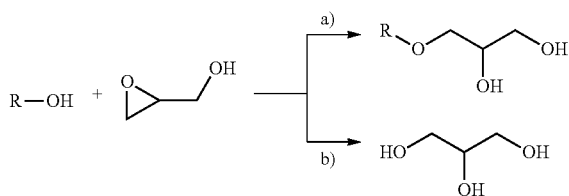

By way of simplification, in the present invention, only regioisomer b) is ever depicted. However, what are meant are always both regioisomers a) and b) or mixtures thereof.

Preferred copolymers of the invention are copolymers of the general structure (I) in which $R^1$ is selected from C1-C18 alkyl, more preferably from methyl or ethyl,

X=O,

A is in each case independently ethylene, propylene and/or butylene, more preferably ethylene, B is in each case independently ethylene, propylene and/or butylene, more preferably ethylene, $R^3$ is H, m is in each case independently an integer in the range of 0-350, more preferably 2-200, even more preferably 5-150, especially 7-30, n is an integer in the range of 1-100, more preferably 2-75, most preferably 5-55, p=0, q is an integer in the range of 1-10, more preferably 2-8, most preferably 4-7, and o is an integer in the range of 1-50, more preferably 3-40, even more preferably 6-30, especially 8-20.

The number of linear structural units (BO), in the general structure (I) is dependent on o and q. The number of structural units (BO), is equal to o x q +1.

The structural elements (AO) and (BO) of the general structure (I) are polyalkylene oxide chains. Preferably, a proportion of ethylene oxide units in the polyalkylene oxide chains, based on all alkylene oxide units present, is more than 90 mol%, especially more than 95 mol%, preferably more than 98 mol%, especially 100 mol%. In a particular embodiment, the polyalkylene oxide chains do not have any hydrophobic groups, especially any alkylene oxides having three or more carbon atoms. A high proportion of ethylene oxide units or a low content of alkylene oxides having three or more carbon atoms reduces the risk of unwanted input of air.

Weight-average molecular weight ($M_w$) in the present context is determined by gel permeation chromatography (GPC) with polyethylene glycol (PEG) as standard. This technique is known per se to the person skilled in the art. Copolymers of the invention may have a molar mass $M_w$ in the range of 200-40'000 g/mol. In preferred copolymers, the parameters n, m, o and p in the general structure (I) are chosen such that the average molar mass $M_w$ of the copolymers is in the range of 200-75'000, preferably 500-50'000, especially preferably 1'000-35'000, even more preferably 1'500-25'000, especially 2'000-15'000.

Particular preference is given to copolymers of the general structure (I) in which $R^1$ is a methyl or ethyl unit.

In a preferred embodiment, copolymers of the invention are those copolymers of the general structure (I) in which p=0 if n>0 and in which p=1 if n=0. In this embodiment, in each copolymer, there is thus either an (AO), unit or an $R^2$-X unit.

In a further preferred embodiment, all m are chosen such that the average number of (BO) units in each of the oxq+1 linear structures is the same.

In accordance with a preferred embodiment, inventive copolymers are those copolymers of the general structure (I) in which $R^1$ is selected from C1-C18 alkyl, more preferably from methyl or ethyl,

X=O,

A is in each case independently ethylene, propylene and/or butylene, more preferably ethylene, B is in each case independently ethylene, propylene and/or butylene, more preferably ethylene, $R^3$ is H, m is in each case independently an integer in the range of 0-350, more preferably 2-200, even more preferably 5-150, especially 7-30, n is an integer in the range of 1-100, more preferably 2-75, most preferably 5-55, p=0, and o is an integer in the range of 1-50, more preferably 3-40, even more preferably 6-30, especially 8-20, and q=1. Such copolymers conform to the general structure (II)

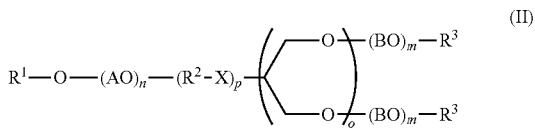

Copolymers of the general structure (II) can be prepared in a process comprising the steps of
1) reacting an alcohol $R^1$—OH with an alkoxylating agent, preferably ethylene oxide, where $R^1$=C1-C18 alkyl, preferably methyl or ethyl,
2) reacting the reaction product from step 1) with glycidol, and
3) reacting the reaction product from step 2) with an alkoxylating agent, preferably ethylene oxide.

In accordance with a further preferred embodiment, inventive copolymers are those copolymers of the general structure (I) in which $R^1$ is selected from C1-C18 alkyl, more preferably from methyl or ethyl,

X=O,

A is in each case independently ethylene, propylene and/or butylene, more preferably ethylene, B is in each case independently ethylene, propylene and/or butylene, more preferably ethylene, $R^3$ is H, m is in each case independently an integer in the range of 0-350, more preferably 2-200, even more preferably 5-150, especially 7-30, n is an integer in the range of 1-100, more preferably 2-75, most preferably 5-55, p=0, and o is an integer in the range of 1-50, more preferably 3-40, even more preferably 6-30, especially 8-20, and q is at least 2. Such copolymers conform to the general structure (III)

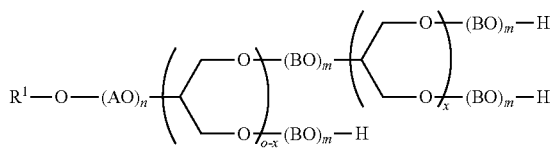

where x is an integer of 1-9, with the proviso that x <o.

Copolymers of the general structure (III) can be prepared in a process comprising the steps of
1) reacting an alcohol $R^1$—OH with an alkoxylating agent, preferably ethylene oxide, where $R^1$=C1-C18 alkyl, preferably methyl or ethyl,
2) reacting the reaction product from step 1) with a mixture of glycidol and an alkoxylating agent, preferably ethylene oxide,
3) reacting the reaction product from step 2) with an alkoxylating agent, preferably ethylene oxide.

In accordance with a further preferred embodiment, inventive copolymers are those copolymers of the general structure (I) in which $R^1$ is selected from C2-C18 alkenyl, more preferably from vinyl, allyl, methallyl, or isoprenyl, especially methallyl,

X=O,

B is in each case independently ethylene, propylene and/or butylene, more preferably ethylene, R2 is C1-C16 alkyl, more preferably C2-C4 alkyl, especially butyl, $R^3$ is H, m is in each case independently an integer in the range of 0-350, more preferably 2-200, even more preferably 5-150, especially 7-30, n=0, p=1, and o is an integer in the range of 1-50, more preferably 3-40, even more preferably 6-30, especially 8-20, and q is at least 2. Such copolymers conform to the general structure (IV)

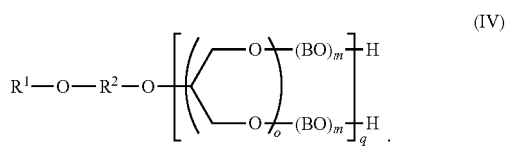

Copolymers of the general structure (IV) can be prepared in a process comprising the steps of
1) reacting an alcohol $R^1$—OH with a halogenated alcohol Hal-$R^2$-XH, where $R^1$=C2-C18 alkenyl, R2 is C1-C16 alkyl, Hal is Cl, Br or I, and X is O,
2) reacting the reaction product from step 1) with glycidol, and
3) reacting the reaction product from step 2) with an alkoxylating agent, preferably ethylene oxide.

In accordance with a further preferred embodiment, inventive copolymers are those copolymers of the general structure (I) in which $R^1$ is selected from C1-C18 alkyl, more preferably from methyl or ethyl,

X=O,

B is in each case independently ethylene, propylene and/or butylene, more preferably ethylene, $R^2$ is C1-C16 alkyl, more preferably C2-C4 alkyl, especially butyl, $R^3$ is H, m is in each case independently an integer in the range of 0-350, more preferably 2-200, even more preferably 5-150, especially 7-30, n=0, p=0, q is an integer in the range of 1-10, and o is in each case independently an integer in the range of 1-50, more preferably 3-40, even more preferably 6-30, especially 8-20. Such copolymers conform to the general structure (V)

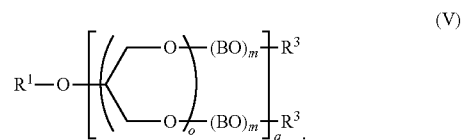

Copolymers of the general structure (V) can be prepared in a process comprising the steps of
1) reacting an alcohol $R^1$—OH with glycidol,
2) reacting the reaction product from step 1) with an alkoxylating agent, preferably ethylene oxide.

In accordance with a very particularly preferred embodiment, inventive copolymers are those copolymers of the general structure (I) in which
$R^1$ is selected from methyl,
X=O,
A is ethylene,
B is ethylene,
$R^3$ is H,
m is in each case independently an integer in the range of 5-20,
n=5,
p=0,
o=an integer in the range of 3-10, and
q=1.

Such copolymers conform to the general structure (VI)

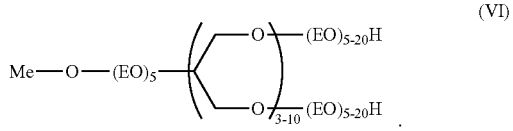

(VI)

Copolymers of the general structure (VI) can be prepared in a process comprising the steps of
1) reacting methanol with ethylene oxide,
2) reacting the reaction product from step 1) with glycidol, and
3) reacting the reaction product from step 3) with ethylene oxide.

The mineral binder composition is especially a workable and/or aqueous mineral binder composition.

The mineral binder composition comprises at least one mineral binder. The expression "mineral binder" is especially understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime).

More particularly, the mineral binder or the binder composition comprises a hydraulic binder, preferably cement. Particular preference is given to a cement having a cement clinker content of 35% by weight. More particularly, the cement is of the CEM I, CEM II and/or CEM III, CEM IV or CEM V type (according to standard EN 197-1).

The mineral binder composition comprises at least one hydraulic binder, preferably cement, at at least 5% by weight, preferably at least 20% by weight, more preferably at at least 35% by weight, even more preferably at at least 65%, especially ≥95% by weight, based in each case on the dry mass of the mineral binder composition.

Alternatively, it may be advantageous when the mineral binder or the mineral binder composition comprises or consists essentially of other binders. These are especially latently hydraulic binders and/or pozzolanic binders. Suitable latently hydraulic and/or pozzolanic binders are, for example, slag, fly ash and/or silica dust. The binder composition may likewise comprise inert substances, for example limestone, quartz flours and/or pigments. In an advantageous embodiment, the mineral binder contains 5-95% by weight, especially 5-65% by weight, more preferably 15-35% by weight, based in each case on the total weight of the binder, of latently hydraulic and/or pozzolanic binders. Advantageous latently hydraulic and/or pozzolanic binders are slag and/or fly ash.

In a particularly preferred embodiment, the mineral binder comprises a hydraulic binder, especially cement or cement clinker, and a latently hydraulic and/or pozzolanic binder, preferably slag and/or fly ash. The proportion of the latently hydraulic and/or pozzolanic binder in this case is more preferably 5-65% by weight, more preferably 15-35% by weight, while at least 35% by weight, especially at least 65% by weight, of the hydraulic binder is present.

The mineral binder composition is preferably a mortar or concrete composition, especially mortar or concrete compositions having a low weight ratio of water to binder (w/b ratio). Specific examples include high-performance concrete (HPC), ultra high-performance concrete (UHPC) or self-compacting concrete (SCC). The mineral binder composition is especially a workable mineral binder composition and/or one which is made up with water.

In a very particularly preferred embodiment, the mineral binder composition accordingly comprises water. A weight ratio of water to binder in the mineral binder composition (w/b ratio) is preferably in the range of 0.18-0.6, more preferably 0.2-0.5, even more preferably 0.22-0.4, in particular 0.22-0.37, especially 0.22-0.28 or 0.32-0.37.

The copolymer of the invention is advantageously present in an amount of 0.01-10% by weight, especially 0.1-7% by weight or 0.2-5% by weight, based in each case on the total weight of mineral binder.

In a preferred embodiment, the mineral binder composition comprises fines, preferably in a proportion of >250 kg/m³, especially 350-600 kg/m³. A cement content here is especially between 200-800 kg/m³, preferably 320-500 kg/m³.

The fines especially include fly ash, metakaolin, silica dust and/or inert rock flour.

More particularly, the fines have the fineness of cement. More particularly, a greatest grain diameter of the fines, for example measured by laser granulometry, is below 0.125 mm.

The fines preferably have a Blaine fineness of at least 1'000 cm²/g, especially at least 1'500 cm²/g, preferably at least 2'500 cm²/g, even further preferably at least 3'500 cm²/g or at least 5'000 cm²/g.

Copolymers of the invention have zero or only low water reduction capacity. This is advantageous since they are therefore usable for reduction of viscosity in mineral binder compositions known per se that contain water-reducing substances, for example superplasticizers, without having to adjust the amount of superplasticizer or water.

In a further preferred embodiment, the mineral binder composition therefore further comprises at least one superplasticizer selected from the group of the lignosulfonates, polynaphthalenesulfonates, polymelaminesulfonates and/or polycarboxylate ethers, especially at least one polycarboxylate ether.

Polycarboxylate ethers are comb polymers having a polycarboxylate base skeleton and polyalkylene oxide side chains.

Preferred polycarboxylate ethers include structural units of the formula VII and structural units of the formula VIII,

(VII)

-continued

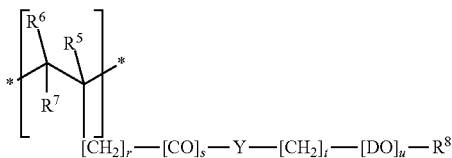

(VIII)

where $R^4$ is in each case independently —COOM, —SO$_2$—OM, —O—PO(OM)$_2$ and/or —PO(OM)$_2$, preferably —COOM, $R^5$ are each independently H, —CH$_2$—COOM or an alkyl group having 1 to 5 carbon atoms, preferably H or —CH$_3$, $R^6$ are each independently H or an alkyl group having 1 to 5 carbon atoms, preferably H, $R^7$ are each independently H, —COOM or an alkyl group having 1 to 5 carbon atoms, preferably H, or where $R^4$ and $R^7$ form a ring to give —CO—O—CO— (anhydride), M is in each case independently H$^+$, an alkali metal ion, an alkaline earth metal ion, a di- or trivalent metal ion, an ammonium group or an organic ammonium, preferably H$^+$ or an alkali metal ion, r=0, 1 or 2,
S=0 or 1,
t=0, or an integer from 1 to 4,
u=2-250, especially 10-200,
Y is in each case independently —O— or —NH—,
$R^8$, in each case independently, is H, a $C_1$ to $C_{20}$ alkyl group, cyclohexyl group or alkylaryl group, and
D=$C_2$ to $C_4$ alkylene, preferably ethylene.

The molar ratio of structural unit VII to structural unit VIII is preferably 0.7-10:1, more preferably 1-8:1, in particular 1.5-5:1.

It may also be advantageous when the polycarboxylate ether additionally comprises a structural unit IX. Structural unit IX is preferably derived from monomers selected from the group consisting of alkyl or hydroxyalkyl esters of acrylic or methacrylic acid, vinyl acetate, styrene and N-vinylpyrrolidone.

The polycarboxylate ether preferably contains carboxylic acid groups and/or salts thereof and polyethylene glycol side chains.

Preferably, the polycarboxylate ether is composed of structural units VII derived from ethylenically unsaturated carboxylic acids, in particular unsaturated monocarboxylic acids, or salts thereof, and structural units VIII derived from ethylenically unsaturated polyalkylene glycols, in particular polyethylene glycols. In particular, the polycarboxylate ether does not contain any other structural units aside from structural units VII and structural units VIII.

Superplasticizers, especially polycarboxylate ethers, may be added in mineral binder compositions at 0-10% by weight, preferably 0.1-8% by weight, especially 0.25-7% by weight, calculated as the dry weight of the plasticizer, based on the total weight of the binder compositions.

In a further aspect, the invention therefore relates to the use of a copolymer of the invention in a mineral binder composition containing a superplasticizer selected from the group of lignosulfonates, polynaphthalenesulfonates, polymelaminesulfonates and/or polycarboxylate ethers, especially at least one polycarboxylate ether.

It is possible to add a copolymer of the invention as such to a mineral binder composition. It is alternatively possible to add a copolymer of the invention as an aqueous solution or emulsion in water to a mineral binder composition. It is further possible to dissolve or disperse a copolymer of the invention in an additive, especially an aqueous additive.

A further aspect of the present invention is therefore an additive comprising at least one copolymer prepared in a multistage process comprising the steps of 1) optionally reacting a starter S, selected from the group consisting of alcohols, amines, carboxylic acids or amides of the general formula $R^1$-XH, with an alkoxylating agent and/or a halogenated alcohol or halogenated amine Hal-$R^2$- XH, where $R^1$=C1-C18 alkyl, C2-C18 alkylene, C3-C10 cycloalkyl, C6-C30 aryl, C7-C30 aralkyl or C1-C18 carbonyl, X=O or NH, Hal=Cl, Br or I, and $R^2$=C1-C16 alkyl, 2) reacting a starter S, selected from the group consisting of alcohols, amines, carboxylic acids or amides of the general formula $R^1$-XH, where $R^1$=C1-C18 alkyl, C2-C18 alkylene, C3-C10 cycloalkyl, C6-C30 aryl, C7-C30 aralkyl or C1-C18 carbonyl, X=O or NH, or the reaction product from step 1) with glycidol or epichlorohydrin or a mixture of glycidol and an alkoxylating agent or a mixture of epichlorohydrin and an alkoxylating agent, 3) optionally reacting the reaction product from step 2) with an alkoxylating agent.

In addition, the additive may comprise at least one polycarboxylate ether and/or water. The additive may be used as dispersant for mineral binders, in which case it is simultaneously possible to reduce viscosity and reduce water demand.

Preferably, the weight ratio of copolymer of the invention to polycarboxylate ether in an aqueous additive is in the range between 0.05:5-1:1, preferably 0.1:3-1:1, more preferably 0.1:3-1:3.

In a further aspect, the invention relates to a composition, especially a mortar composition, a concrete composition or a cementitious composition, comprising at least one copolymer as described above and a mineral binder. The mineral binder is preferably a hydraulic binder, especially cement, preferably portland cement.

The composition is especially a high-performance concrete, ultrahigh-performance concrete or self-compacting concrete.

The copolymer advantageously has a proportion of 0.01-10% by weight, especially 0.1-7% by weight or 0.2-5% by weight, based on the weight of the mineral binder.

In particular, the composition contains fines, preferably with a proportion of >350 kg/m$^3$, especially 400-600 kg/m$^3$. A cement content here is especially between 320 and 380 kg/m$^3$.

A further aspect relates to a method for controlling the rheology of mineral binder compositions, especially of HPC, UH PC or SCC, characterized in that at least one copolymer of the invention is added to the dry mix of the mineral binder composition and/or is added to the mineral binder composition together with the mixing water, especially as aqueous solution or emulsion in the mixing water, and/or is added to the mineral binder composition shortly after addition of the mixing water. Controlling the rheology is understood in the present context to mean that the addition of a copolymer of the invention lowers the viscosity, especially measured as funnel flow time according to DIN EN 12350-9 and/or run time according to JSCE F 541-1999, of the respective mineral binder composition, or increases the flowability, without significantly altering the spread, measured according to DIN EN 12350-5, and/or the slump, measured according to DIN EN 12350-2. In other words, the expression "controlling the rheology" in the present context means an increase in the flow rate and reduction in the viscosity of a mineral binder composition. Preferably, "controlling the rheology" in the present context is understood to mean an increase in the flow rate and reduction in the viscosity without a significant change in spread and/or slump of a mineral binder composition. "Dry mix" is understood to mean a mineral binder composition containing all the components of the mineral binder composition except water.

More particularly, in a method of the invention for controlling the rheology of mineral binder compositions, especially of HPC, UHPC or SCC, at a dosage of a copolymer of the invention of 0.01-10% by weight, especially 0.1-7% by weight or 0.2-5% by weight, based in each case on the total weight of the mineral binder, the funnel flow time according to DIN EN 12350-9 is reduced by at least 5%, preferably at least 10%, more preferably at least 15%, and/or the run time according to JSCE-F 541-1999 of the mineral binder composition is reduced by at least 10%, preferably at least 15%, more preferably at least 25%, especially at least 30%, compared to funnel flow time and/or run time of an analogous composition not containing the copolymer of the invention.

In addition, in a method of the invention for controlling the rheology of mineral binder compositions, especially of HPC, UHPC or SCC, at a dosage of a copolymer of the invention of 0.01-10% by weight, especially 0.1-7% by weight or 0.2-5% by weight, based in each case on the total weight of the mineral binder, spread according to DIN EN 12350-5 and/or slump according to DIN EN 12350-2 of the mineral binder composition changes by less than 15%, especially less than 10%, preferably less than 5%, especially less than 3% or less than 2%, compared to spread and/or slump of an analogous composition not containing the copolymer of the invention.

A further aspect relates to a shaped body obtainable by hardening a mineral binder composition as described above, especially HPC, UHPC or SCC, containing at least one copolymer of the invention, after addition of water.

The invention is elucidated in detail hereinafter by examples. However, the examples serve merely for illustration and should not be regarded as a restriction of the scope of the invention.

EXAMPLES

Example 1

Preparation of the Copolymers used

Preparation of C-1

Step 1: In a reactor inertized with $N_2$ gas, 4 g (0.074 mol) of sodium methoxide are dissolved in 576 g (8 mol) of methallyl alcohol and heated to 100° C. This is followed by metered addition of 1760 g (40 mol) of ethylene oxide over the course of 5 hours.

In the course of this, the temperature is kept at 100 to 140° C. and the pressure at 1 to 3 bar. After the metered addition has ended, the reaction mixture is stirred at 140° C. for 2 hours. Subsequently, the mixture is cooled to 30° C.

Step 2: In a reactor inertized with $N_2$ gas, 0.54 g (0.01 mol) of sodium methoxide is added to 123 g (0.42 mol) of the mixture from step 1) and heated to 130° C. This is followed by metered addition of 93 g (1.26 mol) of glycidol over the course of 30 minutes. In the course of this, the temperature is kept at 130 to 140° C. and the pressure at 1 to 3 bar. After the metered addition has ended, the reaction mixture is stirred at 140° C. for 2 hours. The mixture is left to cool to 50° C.

Step 3: After cooling to 50° C., 2.2 g (0.04 mol) of sodium methoxide are added to the mixture from step 2). The reactor is inertized again with $N_2$ gas and heated to 130° C. This is followed by metered addition of 628 g (14.27 mol) of ethylene oxide over the course of 4 hours. In the course of this, the temperature is kept at 130 to 140° C. and the pressure at 0 to 3 bar. After the metered addition has ended, the reaction mixture is stirred at 140° C. for 3 hours. Subsequently, the mixture is cooled to 50° C. and neutralized with 3.2 g (0.054 mol) of acetic acid. The resultant mixture is the inventive copolymer C-1.

Preparation of C-2

The preparation of C-2 is analogous to the preparation of C-1. However, 2513 g of ethylene oxide (57 mol) are metered in for preparation of C-2 in step 3).

Preparation of C-4

The preparation of C-4 is analogous to the preparation of C-1. However, in step 1), 256 g of methanol (8 mol) are used in place of methallyl alcohol.

Preparation of C-5

The preparation of C-5 is analogous to the preparation of C-4. However, 2513 g of ethylene oxide (57 mol) are metered in for preparation of C-5 in step 3).

Preparation of C-6

The preparation of C-6 is analogous to the preparation of C-5. However, 186 g (2.51 mol) of glycidol are metered in for preparation of C-6 in step 2).

Table 1 below gives an overview of the PCEs and copolymers used as additives.

TABLE 1

| | Overview of the PCEs and polymers used as additives |
|---|---|
| R-1 | Aqueous solution of a PCE (55% dry matter) formed from acrylic acid (3.6 mol) and ethoxylated methallyl alcohol (Mw = 2'400 g/mol; 1 mol) |
| R-2 | Aqueous solution of a PCE (30% dry matter) formed from polyacrylic acid (Mw = 5'000 g/mol), esterified with a mixture of two methyl polyethylene glycols (Mw = 1'000 g/mol and 3'000 g/mol, molar ratio 1.3:1) in a molar ratio of acid and ester of 1.9:1. |
| R-3 | ViscoCrete 1100 NT (available from Sika AG) |
| PPG | polypropylene glycol (Mn = 192 g/mol) |
| PEG | polyethylene glycol (Mn = 150 g/mol) |
| C-1 | Copolymer prepared by successive reaction of methallyl alcohol with 1) 5 equivalents of ethylene oxide 2) 3 equivalents of glycidol 3) 34 equivalents of ethylene oxide |
| C-2 | Copolymer prepared by successive reaction of methallyl alcohol with 1) 5 equivalents of ethylene oxide 2) 3 equivalents of glycidol 3) 136 equivalents of ethylene oxide |
| C-4 | Copolymer prepared by successive reaction of methanol with 1) 5 equivalents of ethylene oxide 2) 3 equivalents of glycidol 3) 34 equivalents of ethylene oxide |
| C-5 | Copolymer prepared by successive reaction of methanol with 1) 5 equivalents of ethylene oxide 2) 3 equivalents of glycidol 3) 136 equivalents of ethylene oxide |

TABLE 1-continued

Overview of the PCEs and polymers used as additives

| | |
|---|---|
| C-6 | Copolymer prepared by successive reaction of methanol with<br>1) 5 equivalents of ethylene oxide<br>2) 6 equivalents of glycidol<br>3) 136 equivalents of ethylene oxide |

Example 2

Paste Tests

A dry mix was produced, consisting of 150 g of cement (CEM I 42.5 N from Vigier Holding AG), 5.8 g of microsilica (SikaFume® -HR/-TU, available from Sika Schweiz AG), 69.2 g of blast furnace slag (Regen GGBS from Hanson UK) and 41.5 g of limestone (Nekafill 15 from Kalkfabrik Netstal AG). For production of the dry mix, the constituents were dry mixed in a Hobart mixer for 30 seconds. Added to this dry mixture were the additives specified in table 2, each dissolved in 60 g of water. Mixing was continued at level 1 for 30 seconds, and finally at level 2 for 3.5 minutes.

Flow times according to DIN EN 12350-9 and spread according to DIN EN 12350-5 were measured on the cement pastes obtained. What was measured in each case was the time after which 210 g of the respective mixture V1-V3 (noninventive) or E1-E3 (inventive) had run out completely. Table 2 below gives an overview of the results.

TABLE 2

Results of the paste tests

| Test | Additive* | Flow time [s] | Spread [mm] |
|---|---|---|---|
| V1 | 3% R-1 | 215 | 165 |
| V2 | 3% R-1 + 1% PPG | 423 | 170 |
| V3 | 3% R-1 + 1% PEG | 387 | 172 |
| E1 | 3% R-1 + 1% C-4 | 180 | 163 |
| E2 | 3% R-1 + 3% C-4 | 150 | 165 |
| E3 | 3% R-1 + 1% C-6 | 150 | 164 |

*dosage in percent by weight relative to the dry weight of the cement

It becomes clear from table 2 that the use of inventive copolymers in experiments E1-E3 leads to a reduction in flow time, corresponding to an improvement in flowability or a reduction in viscosity. Comparison is made here with a noninventive reference V1 containing solely PCE and no copolymer of the invention. In addition, it becomes clear from table 2 that the copolymers of the invention do not cause any additional liquefaction, i.e. do not cause any reduction in water demand. Finally, it becomes clear from table 2 that the use of polyethylene glycol or polypropylene glycol leads in particular to a distinct increase in flow time. This corresponds to an elevated viscosity.

Example 3

Mortar Tests

A dry mix was produced, consisting of 735 g of cement (CEM I 42.5 N from Vigier Holding AG), 28 g of microsilica (SikaFume® -HR/-TU, available from Sika Schweiz AG), 340 g of blast furnace slag (Regen GGBS from Hanson UK), 203 g of limestone (Nekafill 15 from Kalkfabrik Netstal AG) and 2845 g of aggregates having a particle size of 0-8 mm.

For production of the dry mix, the constituents were dry mixed in a Hobart mixer for 30 seconds. Added to this dry mixture were the additives specified in table 3, each dissolved in the amount of water specified in table 3. Mixing was continued at level 1 for 30 seconds, and finally at level 2 for 3.5 minutes.

Spread according to DIN EN 12350-5 was measured on the mortar obtained directly after mixing (0 minutes) and after a period of 30 minutes. In addition, the funnel flow time was measured to DIN EN 12350-9. Table 3 below gives an overview of the results.

TABLE 3

Results of the mortar tests

| Test | Additive* | Water [g] | Spread [mm] 0' | Spread [mm] 30' | Funnel flow time [s] |
|---|---|---|---|---|---|
| V4 | 3% R-2 | 250 | 264 | 249 | 310 |
| E4 | 3% R-2 1% C-4 | 250 | 272 | 256 | 80 |
| E5 | 3% R-2 3% C-4 | 250 | 268 | 261 | 104 |
| E6 | 3% R-2 0.5% C-4 | 247 | 263 | 247 | 236 |
| E7 | 3% R-2 0.5% C-5 | 247 | 265 | 253 | 300 |
| E8 | 3% R-2 0.5% C-6 | 247 | 262 | 242 | 240 |
| E9 | 3% R-2 1% C-4 | 244 | 267 | 254 | 181 |
| E10 | 3% R-2 1% C-5 | 244 | 250 | 269 | n.m. |
| E11 | 3% R-2 1% C-6 | 244 | 263 | 253 | 243 |
| E12 | 3% R-2 3% C-4 | 232 | 263 | 244 | 210 |

*dosage in percent by weight relative to the dry weight of the cement
n.m.: not measured Inventive experiments E4 and E5 show a distinct reduction in flow time from the V funnel compared to the noninventive experiment V4. This corresponds to an improvement in flowability, or a reduction in viscosity. Inventive experiments E6-E11 show that an improvement in flowability or a reduction in viscosity can also be achieved when the amount of water is reduced.

The results from table 3 also show that the use of copolymers of the invention has only a minor influence on spread, and hence the yield point of mineral binder compositions varies only slightly.

Example 4

Concrete Tests

A dry mix was produced, consisting of 340 g of cement (CEM I 42.5 N from Vigier Holding AG), 851 g of quartz sand and 951 g of gravel. For production of the dry mix, the constituents were dry mixed in a Hobart mixer for 30 seconds. Added to this dry mix were the additives specified in table 4, each dissolved in 170 g of water. Mixing was continued at level 1 for 30 seconds, and finally at level 2 for 3.5 minutes.

Slump according to JIS A1150 and flow rate according to JSCE-F-514 were measured on the concretes obtained. Table 4 below gives an overview of the results.

TABLE 4

Results of the concrete tests

| Test | Additive* | Slump [mm] | Flow rate [cm/s] |
|------|-----------|------------|------------------|
| V5 | 1.1% R-3 | 235 | 28.0 |
| E13 | 0.95% R-3 0.5% C-1 | 240 | 40.8 |
| E14 | 0.95% R-3 0.5% C-2 | 235 | 34.5 |

*dosage in percent by weight relative to the dry weight of the cement

It becomes clear from a comparison of inventive experiments E13 and E14 with noninventive experiment V5 that the inventive use of copolymers can distinctly increase the flow rate, corresponding to a reduction in viscosity.

Example 5

Mortar Tests

The dry mix from example 4 was passed through a sieve having a mesh size of 5 mm. Added to the resulting dry mix were the additives specified in table 5, each dissolved in 170 g of water. Mixing was effected in a Hobart mixer at level 1 for 30 seconds, and finally further mixing at level 2 for 3.5 minutes.

Spread according to JIS A1150 and a run time according to JSCE-F 541-1999 were determined on the resulting mortar mixtures. Table 5 below gives an overview of the results.

TABLE 5

Results of the mortar tests

| Test | Additive* | Spread [mm] | Run time [s] |
|------|-----------|-------------|--------------|
| V6 | 1.1% R-3 | 100 | 47.7 |
| E15 | 0.95% R-3 0.5% C-1 | 103 | 24.3 |
| E16 | 0.95% R-3 0.5% C-2 | 105 | 27.1 |

*dosage in percent by weight relative to the dry weight of the cement

It becomes clear from a comparison of inventive experiments E15 and E16 with noninventive experiment V6 that the inventive use of copolymers can distinctly reduce the outflow time, corresponding to a reduction in viscosity.

The invention claimed is:

1. A method comprising adding copolymers to a mineral binder composition in an amount effective for increasing the flow rate and/or for reducing the viscosity of the mineral binder composition wherein the copolymers are selected from the group consisting of
   (a) copolymers of the general structure (I):

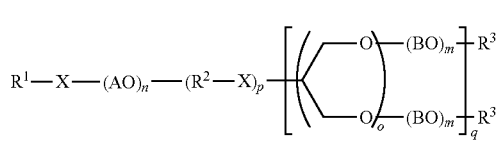

where
R$^1$ is a C1-C18 alkyl, C2-C18 alkylene, C3-C10 cycloalkyl, C6-C30 aryl, C7-C30 aralkyl or C1-C18 carbonyl,
X is O or NH,
A is in each case independently C1-C10 alkylene,
R$^2$ is a C1-C16 alkyl,
B is in each case independently C1-C10 alkylene,
R$^3$ is H, C1-C16 alkyl, or C(O)R$^1$ with R$^1$ as defined above,
m is in each case independently an integer in the range of 2-350,
n is an integer in the range of 0-100,
p is 0 or 1,
q is an integer in the range of 1-10, and
if q is 1, o is an integer in the range of 1-10, and, if q>1, each o is independently an integer in the range of 1-50,
   (b) copolymers of the general structure (II):

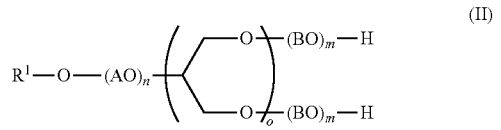

where
R$^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and
   (c) copolymers of the general structure (III):

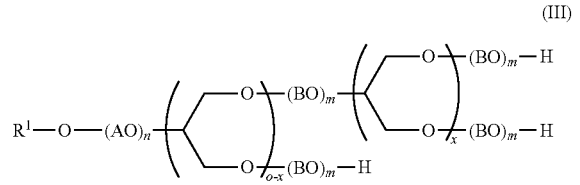

where
R$^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and
x is an integer in the range of 1-9, with the proviso that x<o, and, wherein the copolymers are prepared in a multistage process comprising the steps of
1) optionally reacting a starter S, selected from the group consisting of alcohols, amines, carboxylic acids and amides of the general formula R$^1$-XH, with an alkoxylating agent and/or a halogenated alcohol or halogenated amine Hal-R$^2$-XH, where R$^1$ is a C1-C18 alkyl, C2-C18 alkylene, C3-C10 cycloalkyl, C6-C30 aryl, C7-C30 aralkyl or C1-C18 carbonyl, X is O or NH, Hal is Cl, Br or I, and R$^2$ is a C1-C16 alkyl,
2) reacting a starter S, selected from the group consisting of alcohols, amines, carboxylic acids and amides of the general formula $R^1$-XH, where $R^1$ is a C1-C18 alkyl, C2-C18 alkylene, C3-C10 cycloalkyl, C6-C30 aryl, C7-C30 aralkyl or C1-C18 carbonyl, X is O or NH, or the reaction product from step 1) with glycidol or epichlorohydrin or a mixture of glycidol and an alkoxylating agent or a mixture of epichlorohydrin and an alkoxylating agent, and 3) reacting the reaction product from step 2) with an alkoxylating agent.

2. The method as claimed in claim 1, wherein the average molar mass Mw of the copolymers is in the range of 200-75,000 g/mol.

3. The method as claimed in claim 1, wherein the copolymers include the copolymer of the general structure (I) wherein $R^1$ is a C1-C18 alkyl unit.

4. The method as claimed in claim 1, wherein the mineral binder composition comprises at least one hydraulic binder, at at least 5% by weight, based on the dry mass of the mineral binder composition.

5. The method as claimed in claim 1, wherein the copolymer is present in an amount of 0.01-10% by weight, based on the total weight of mineral binder.

6. The method as claimed in claim 1, wherein the mineral binder composition further comprises water in such an amount as to result in a ratio of water to mineral binder in the range of 0.18-0.6.

7. The method as claimed in claim 1, wherein the mineral binder composition is a high-performance concrete, ultra-high-performance concrete or self-compacting concrete.

8. The method as claimed in claim 1, wherein the mineral binder composition comprises at least one superplasticizer selected from the group of lignosulfonates, polynaphthalenesulfonates, polymelaminesulfonates and/or polycarboxylate ethers.

9. The method as claimed in claim 1, wherein $R^1$ is selected from the group consisting of methyl, vinyl, allyl, methallyl, and isoprenyl.

10. The method as claimed in claim 1, wherein the starter S is selected from the group consisting of methanol, vinyl alcohol, allyl alcohol, methallyl alcohol and isoprenol.

11. The method as claimed in claim 1, wherein the starter S is methanol.

12. The method as claimed in claim 1, wherein the starter S is selected from the group consisting of vinyl alcohol, allyl alcohol and methallyl alcohol.

13. The method as claimed in claim 1, wherein the starter S is isoprenol.

14. An additive for mineral binder compositions, comprising at least one copolymer prepared in a multistage process wherein the copolymer is selected from the group consisting of a) copolymer of the general structure (I):

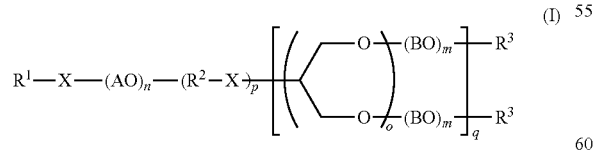

where
$R^1$ is a C1-C18 alkyl, C2-C18 alkylene, C3-C10 cycloalkyl, C6-C30 aryl, C7-C30 aralkyl or C1-C18 carbonyl, X is O or NH,
A is in each case independently C1-C10 alkylene,
$R^2$ is a C1-C16 alkyl, B is in each case independently C1-C10 alkylene,
$R^3$ is H, C1-C16 alkyl, or $C(O)R^1$ with $R^1$ as defined above,
m is in each case independently an integer in the range of 2-350,
n is an integer in the range of 0-100,
p is 0 or 1,
q is an integer in the range of 1-10, and
if q is 1, o is an integer in the range of 1-10, and, if q>1, each o is independently an integer in the range of 1-50, (b) copolymer of the general structure (II):

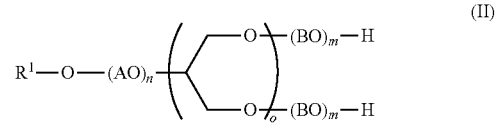

where
$R^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and (c) copolymer of the general structure (III):

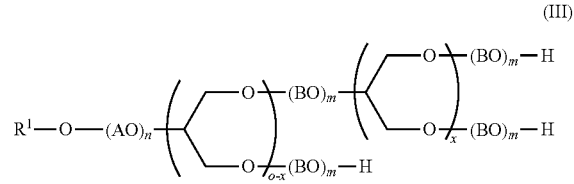

where
$R^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and
x is an integer in the range of 1-9, with the proviso that x<o, and wherein, the multistage process comprising the steps of 1) optionally reacting a starter S, selected from the group consisting of alcohols, amines, carboxylic acids and amides of the general formula $R^1$-XH, with an alkoxylating agent and/or a halogenated alcohol or halogenated amine Hal-$R^2$-XH, where $R^1$ is a C1-C18 alkyl, C2-C18 alkylene, C3-C10 cycloalkyl, C6-C30 aryl, C7-C30 aralkyl or C1-C18 carbonyl, X is O or NH, Hal is Cl, Br or I, and $R^2$ is a C1-C16 alkyl, 2) reacting a starter S, selected from the group consisting of alcohols, amines, carboxylic acids and amides of the general formula $R^1$-XH, where $R^1$ is a C1-C18 alkyl, C2-C18 alkylene, C3-C10 cycloalkyl, C6-C30 aryl, C7-C30 aralkyl or C1-C18 carbonyl, X is O or NH, or the reaction product from step 1) with glycidol or epichlorohydrin or a mixture of glycidol and an alkoxylating agent or a mixture of epichlorohydrin and an alkoxylating agent, and 3) reacting the reaction product from step 2) with an alkoxylating agent.

15. The additive as claimed in claim 14, wherein the additive additionally comprises at least one polycarboxylate ether, where the ratio of copolymer to polycarboxylate ether is in the range between 0.05:5-1:1.

16. A method for controlling the rheology of a mineral binder composition, wherein an additive as claimed in claim 14 is added to the dry mix of the mineral binder composition and/or is added together with the mixing water and/or is added shortly after addition of the mixing water.

17. A mineral binder composition comprising at least one mineral binder and at least one copolymer prepared in a multistage process wherein the copolymer is selected from the group consisting of (a) copolymer of the general structure (I):

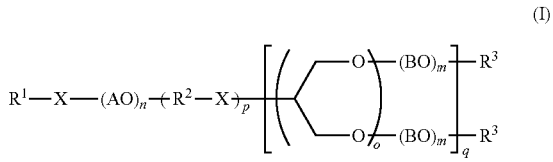

where
$R^1$ is a C1-C18 alkyl, C2-C18 alkylene, C3-C10 cycloalkyl, C6-C30 aryl, C7-C30 aralkyl or C1-C18 carbonyl,
X is O or NH,
A is in each case independently C1-C10 alkylene,
$R^2$ is a C1-C16 alkyl,
B is in each case independently C1-C10 alkylene,
$R^3$ is H, C1-C16 alkyl, or $C(O)R^1$ with $R^1$ as defined above,
m is in each case independently an integer in the range of 2-350,
n is an integer in the range of 0-100,
p is 0 or 1,
q is an integer in the range of 1-10, and
if q is 1, o is an integer in the range of 1-10, and, if q>1, each o is independently an integer in the range of 1-50, (b) copolymer of the general structure (II):

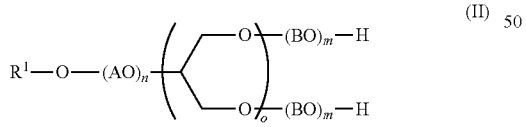

where
$R^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and (c) copolymer of the general structure (III):

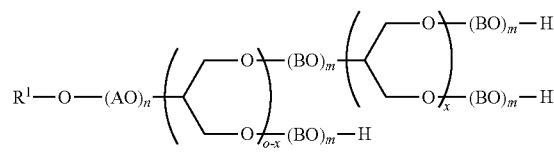

where
$R^1$ is selected from C1-C18 alkyl,
A is in each case independently ethylene, propylene and/or butylene,
B is in each case independently ethylene, propylene and/or butylene,
m is in each case independently an integer in the range of 2-350,
n is an integer in the range of 1-100,
o is an integer in the range of 1-50, and
x is an integer in the range of 1-9, with the proviso that x<o, and wherein, the multistage process comprising the steps of 1) optionally reacting a starter S, selected from the group consisting of alcohols, amines, carboxylic acids and amides of the general formula $R^1$-XH, with an alkoxylating agent and/or a halogenated alcohol or halogenated amine Hal-$R^2$-XH, where $R^1$ is a C1-C18 alkyl, C2-C18 alkylene, C3-C10 cycloalkyl, C6-C30 aryl, C7-C30 aralkyl or C1-C18 carbonyl, X is O or NH, Hal is Cl, Br or I, and $R^2$ is a C1-C16 alkyl, 2) reacting a starter S, selected from the group consisting of alcohols, amines, carboxylic acids and amides of the general formula $R^1$-XH, where $R^1$ is a C1-C18 alkyl, C2-C18 alkylene, C3-C10 cycloalkyl, C6-C30 aryl, C7-C30 aralkyl or C1-C18 carbonyl, X is O or NH, or the reaction product from step 1) with glycidol or epichlorohydrin or a mixture of glycidol and an alkoxylating agent or a mixture of epichlorohydrin and an alkoxylating agent, and 3) optionally reacting the reaction product from step 2) with an alkoxylating agent.

18. A shaped body produced by curing a mineral binder composition as claimed in claim 17 after addition of water.

* * * * *